United States Patent [19]

Ward et al.

[11] B 3,914,433

[45] Oct. 21, 1975

[54] METHOD OF RELIEVING THE DISCOMFORT OF PHARYNGITIS

[75] Inventors: John W. Ward, Richmond; Robert A. Lybrand, Ashland, both of Va.

[73] Assignee: A. H. Robins Company, Incorporated, Richmond, Va.

[22] Filed: June 20, 1973

[21] Appl. No.: 371,805

[44] Published under the Trial Voluntary Protest Program on January 28, 1975 as document no. B 371,805.

Related U.S. Application Data

[63] Continuation-in-part of Ser. No. 167,869, July 30, 1971, abandoned.

[52] U.S. Cl. ................ 424/315; 424/56; 424/180
[51] Int. Cl.² ................................ A61K 31/185
[58] Field of Search ............... 424/56, 180, 315

[56] References Cited
UNITED STATES PATENTS

| | | | |
|---|---|---|---|
| 2,004,873 | 6/1935 | Kirstahler et al. | 424/56 |
| 2,054,742 | 9/1936 | Elbel | 424/56 |
| 3,279,987 | 10/1966 | Vierling | 424/247 |

OTHER PUBLICATIONS

Kirk–Othmer, Encyclopedia of Chemical Technology, 12, (1969), pp. 361–363 & 367–372.

Vocac et al., Chemical Abstracts, 71:53567n, (1969).

Vocac et al., Chemical Abstracts, 72:30055a, (1970).

Vocac et al., Chemical Abstracts, 69:94870h, (1968).

*Primary Examiner*—Albert T. Meyers
*Assistant Examiner*—Norman A. Drezin

[57] ABSTRACT

Compositions and methods useful for the amelioration of the distress caused by pharyngitis are disclosed. The compositions comprise lignosulfonates and pharmaceutically acceptable carriers therefor.

2 Claims, No Drawings

METHOD OF RELIEVING THE DISCOMFORT OF PHARYNGITIS

This application is a continuation-in-part of our co-pending application Ser. No. 167,869 filed July 30, 1971 now abandoned.

The present invention is concerned with a method for the alleviation of the pain and discomfort associated with pharyngitis and with compositions useful in said method.

The discomfort associated with pharyngitis and generally referred to as a sore throat is the pain associated with inflammation of the oral pharynx. The pain results from the irritation of the exposed nerve endings located on the surface of the mucosa. The nerve endings are left exposed because the mucous barrier which is normally present in the oral pharynx has been disrupted.

Pharyngitis is the result of various factors such as excessive smoking, alcohol, vapors or irritant chemicals and the onset of the malady of the common cold. Medicaments which have been used in attempted amelioration of the discomfort of a sore throat include gargling with warm saline and proprietary antiseptic mouthwashes or the use of solid preparations which dissolve in the mouth and contain various local anesthetics. While all of the foregoing are widely used, their effectiveness, particularly where inflammation is involved, is questionable. It is generally conceded that these preparations have little, if any, effect. Thier use has been associated with a psychological effect rather than a pharmacodynamic effect.

The present invention is based on the discovery that when a lignosulfonate is administered orally to a person suffering from pharyngitis, prompt and dramatic relief of the discomfort associated with pharyngitis is realized. While the mechanism by which the therapeutic effect is realized has not been fully elucidated, it is postulated that the lignosulfonate which is a macro molecular substance binds with the newly secreted mucoproteins to form a semi-artificial surface which serves as a protective barrier and thus protects the nerve endings from external irritants.

The lignosulfonates of the present invention can be administered to a human being suffering from the discomfort of pharyngitis in either a liquid or a solid form. Suitable liquid preparations can be prepared wherein the concentration of the lignosulfonate is 0.5 to 20.0 percent, the preferred concentration being 1.0 to 10.0 percent. The liquid preparations are suitable for use as a gargle or they can be sipped in small amounts. Suitable solid forms of the lignosulfonates can be pastilles, troches, lozenges, dragees or in any other suitable solid form which can be retained in the mouth while the active ingredient is slowly released by the dissolving of the solid preparation. The concentration of the lignosulfonate in the solid preparation can be 1.0% to 15.0%, the preferred concentration being 3.0 to 10.0 percent.

It is, therefore, a primary object of the present invention to provide a method for the alleviation of discomfort caused by pharyngitis by orally administering to a human being suffering therefrom a therapeutically effective amount of a lignosulfonate.

Another object is to provide a method for the alleviation of discomfort caused by pharyngitis by orally administering to a human being suffering therefrom a therapeutic composition containing from 0.5 to 20.0 percent of a lignosulfonate.

A further object is to provide therapeutic compositions useful in alleviating the discomfort of pharyngitis in a human being suffering therefrom wherein said therapeutic compositions contain a therapeutically effective amount of a lignosulfonate.

A still further object is to provide therapeutic compositions useful in alleviating the discomfort of pharyngitis in a human being suffering therefrom wherein said therapeutic compositions contain 0.5 to 20.0 percent of a lignosulfonate.

Other objects of the invention will become apparent to one skilled in the art from a consideration of the following detailed embodiments.

As used in the present invention a lignosulfonate is material resulting from the sulfonation of natural lignin. The exact structure of a lignosulfonate has not been completely determined but it is known that the basic lignin monomer unit is a substituted phenyl propane. Despite the fact that a lignosulfonate cannot be specified with certainty in terms of its chemical formula, it has been found that lignosulfonates isolated from the spent liquors of the sulfite pulping of wood or those which are manufactured as, for example, by the Marathon Division of the American Can Company of Neenah, Wis., under the name "Marasperses," are useful in practising the present invention.

It has been found that crude lignosulfonate material which is commercially available as a 30 percent solution or crude lignosulfonate which is commercially available in a solid form is therapeutically effective in pharyngitis. However, for practising the present invention a purified lignosulfonate is preferred and can be prepared as follows.

EXAMPLE 1

An aqueous commercial solution containing approximately 30 percent solids is diluted to a solution containing 20 percent solids and is adjusted to pH 4–7 by the addition of mineral acid, hydrochloric acid being the preferred acid. The solution is then subjected to reverse osmosis using a membrane having a nominal molecular weight cut-off of about 20,000 (such as a Havens International Type 215 module) until aliquot analysis of the permeate indicates that substantially all solids having a molecular weight below 10,000 have been removed. The residual solution is spray dried to give the solid lignosulfonate.

EXAMPLE 2

A crude solid commercial lignosulfonate is dissolved in water to give a 20 percent solution and is adjusted to pH 4–7 using a mineral acid, hydrochloric acid being the preferred acid. The solution is put through the reverse osmosis process as described in Example 1. When aliquot analysis of the permeate shows that substantially all solids having a molecular weight below 10,000 have been removed, the residual solution is spray dried to give the solid lignosulfonate.

EXAMPLE 3

A commercial crude solution of lignosulfonate containing 30 percent solids or a solution of the commercial crude solid is adjusted to a solution containing about 10 percent solids. The solution is dialyzed until aliquot analysis of the dialyzate shows low molecular weight materials have been substantially removed. The residual solution (ca. 2 percent solids content) is concentrated to at least a 10 percent solution, keeping the pot temperature below 80°C. The solution is sprayed dried to give the solid lignosulfonate.

FORMULATION AND ADMINISTRATION

Effective quantities of any of the foregoing lignosulfonates may be administered to a person suffering from pharyngitis in any one of various ways, for example, in a liquid form as a gargle or in a solid form as a troche, pastille, dragee or the like.

Although very small quantities of the lignosulfonate are effective when the inflamed area of the oral pharynx is limited, the severity of the discomfort of the pharyngitis will govern the amount to be used initially and the interval of application.

For optimum efficacy in practising the present invention, it should be clearly demonstrated that the soreness of throat complained of is due to inflammation of the oral pharynx. Soreness of throat not attributable to pharyngitis will not be relieved by use of the formulations containing the active ingredients of the present invention.

The liquid preparations are intended to be used as a gargle with subsequent expectoration or they can be sipped in small amounts. When used as a gargle the liquid preparations are maintained in contact with the inflamed area for a period of from about 15 seconds to about three minutes. When the liquid preparations are sipped they are sipped in small portions over a period of from about two minutes to about four minutes. Such preparations are preferably used by those competent to use such a procedure. The solid formulations are designed for use by those who prefer a medicament in a solid form and are especially useful for small children.

The following formulations are representative for all of the pharmacologically active lignosulfonates of the invention but have been especially designed to embody as active ingredient the lignosulfonates which have been purified as described hereinabove.

| | Ingredients | Formulations (1) Solution 1% | 3.3% | 10% |
|---|---|---|---|---|
| 1. | Lignosulfonate | 10.0 gm. | 33.0 gm. | 100.0 gm. |
| 2. | Sorbo | 150.0 ml. | 150.0 ml. | 150.0 ml. |
| 3. | Glycerin | 100.0 ml. | 100.0 ml. | 100.0 ml. |
| 4. | Sodium Benzoate | 1.0 gm. | 1.0 gm. | 1.0 gm. |
| 5. | Sucrose | 30.0 gm. | 40.0 gm. | 50.0 gm. |
| 6. | 0.2N HCl* | 70.0 ml. | 90.0 ml. | 140.0 ml. |
| 7. | Peppermint Flavor Compound No. 21444 Fritzsche | 0.25 ml. | 0.25 ml. | 0.75 ml. |
| 8. | Oil of Spearmint, N.F., Fritzsche | 0.25 ml. | 0.5 ml. | 0.75 ml. |
| 9. | Alcohol, U.S.P., 95% | 50.0 ml. | 50.0 ml. | 50.0 ml. |
| 10. | Caramel Color Acid Proof | 6.5 gm. | 6.0 gm. | — |
| 11. | Water, U.S.P. q.s. | 1,000.0 ml. | 1,000.0 ml. | 1,000.0 ml. |

Procedure

1. Dissolve the sodium benzoate in 500 ml. of water.
2. Mix lignosulfonate and sucrose and add this to the mixing solution from step No. 1.
3. After step No. 2 is a solution, add the glycerin and sorbo.
4. Put the flavors in part of the alcohol and add this to the solution. Rinse container with the remainder of alcohol and add to batch.
5. Adjust pH 3.0-3.5 using 0.2N HCl.
6. Add caramel to adjust color.
7. Q.S. to final volume with $H_2O$.

| | Ingredients | (2) Lozenges Per Lozenge | Per 15,000 Lozenges |
|---|---|---|---|
| 1. | Lignosulfonate | 25.000 mg. | 393.75 gm. |
| 2. | Red Plastic Color | 1.181 mg. | 17.72 gm. |
| 3. | Raspberry Flavor | 0.0025 ml. | 37.5 ml. |
| 4. | Imitation Spice Vanilla | 0.0025 ml. | 37.5 ml. |
| 5. | Candy Base, q.s. | 3.780 gm. | 57.25 kg. |

(2) Red Plastic Color-Striping Red Shade, supplied by H. Kohnstamm & Co., New York, N.Y.
(3) Raspberry Flavor N-2751, supplied by H. Kohnstamm & Co., New York, N.Y.
(4) Imitation Spice Vanilla Flavor No. 23266, supplied by Fritzsche-D & O, New York, N.Y.

Procedure

1. Meter 135 kg. of liquid sucrose and 75 kg. of glucose into jacketed kettles. Heat the mass to 238°F. Pump this blend of sugar and glucose through the cooker at 290°–300°F. as it passes through the coil in the cooking chamber, maintaining a vacuum of 23–25 Hg. in the receiving kettle to remove additional moisture without additional heat.

Deliver 55 kg. of candy base to the mixing kettle. (This amount, when addition of medicament blend is made, will total 57.25 kg.).

Note: At this point the candy base is composed of approximately 64.77% sugar solids 34.63% corn syrup solids 0.6% moisture 2. Carefully add the lignosulfonate and mix thoroughly. Transfer this mass to the mixing and kneading machine. Add color and flavor. Knead to a uniform color and homogenous mixture.
3. Transfer the batch to the cooling slab where it is further mixed by kneading by hand until the material is of proper consistency for forming.
4. Transfer the batch to the horizontal batch roller and through the sizing rollers to the seamless tablet-forming head where the lozenges are punched out.

| Ingredients | (3) Pastilles Amounts |
|---|---|
| 1. Water | 310.0 ml. |
| 2. Agar | 30.0 gm. |

| (3) Pastilles | |
|---|---|
| Ingredients | Amounts |
| 3. Lignosulfonate | 135.0 gm. |
| 4. Sugar | 900.0 gm. |
| 5. Glucose syrup (43DE) | 800.0 gm. |
| 6. Licorice block juice | 150.0 ml. |
| 7. Oil of anise | 2.0 ml. |

Procedure

1. Dissolve the agar in cold water using agitation.
2. Mix the lignosulfonate and sugar intimately and add to the agar solution at about 100°C. with vigorous stirring.
3. Add the glucose syrup with thorough mixing.
4. Add to the above solution with thorough mixing the licorice block juice and oil of anise.
5. Pour the hot mixture into starch molds and let stand overnight.
6. The pastilles are sieved off, lightly steamed and dusted with the finest grade rolling sugar.

PHARMACOLOGY

Table I contains a summary of seven patients treated with a 10 percent solution of lignosulfonate. Inflammation of the oral pharynx was established as being present prior to treatment.

Table 1

| Subject | Severity | Method of Treatment | Results |
|---|---|---|---|
| 1 | mild | gargle | soreness eliminated |
| 2 | mild | gargle | soreness eliminated |
| 3 | severe | gargle | relief obtained within a few minutes; relief persisted for 2-3 hrs. |
| 4 | extremely painful | sipped at intervals | complete relief within a few minutes |
| 5 | persistent sore throat of 3-4 days duration | gargle | relief obtained for 2 hrs.; relief obtained on retreatment |
| 6 | mild | sipped | soreness eliminated |
| 7 | mild | sipped | soreness eliminated |

We claim:

1. A method for the alleviation of discomfort of a human being having pharyngitis which consists of said human being gargling for a period of from about 15 seconds to about three minutes with an effective amount of a composition containing 0.5 to 20 percent of a lignosulfonate having a molecular weight greater than 10,000 and a pharmaceutically acceptable carrier therefor, said gargling followed by expectoration.

2. A method for the alleviation of discomfort of a human being having pharyngitis which consists of said human being sipping in small portions over a period of two to four minutes an effective amount of a composition containing 0.5 to 20 percent of lignosulfonate having a molecular weight greater than 10,000 and a pharmaceutically acceptable carrier therefor.

* * * * *